United States Patent Office 3,253,022
Patented May 24, 1966

3,253,022
N-ARYL SUBSTITUTED 2,3,6-TRICHLORO-
BENZALIMINES
Jerome Linder, Niagara Falls, Edward D. Weil, Lewiston, and Edwin Dorfman, Grand Island, N.Y., assignors to Hooker Chemical Corporation, Niagara Falls, N.Y., a corporation of New York
No Drawing. Filed Oct. 9, 1961, Ser. No. 143,540
9 Claims. (Cl. 260—518)

This invention relates to certain aromatically derived nitrogen-containing compositions useful as plant growth-controlling materials, and methods for their use.

More particularly, this invention describes compositions useful as phytotoxic agents in the control of mature weeds and as germination inhibitors of weed seeds. The compositions of this invention are the aryl and substituted aryl derivatives of 2,3,6-trihalobenzalimine of the structure:

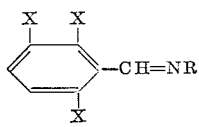

wherein X is halogen, preferably chlorine, and R is a member of the group consisting of aryl and substituted aryl.

Examples of substituted aryl radicals are mono-, di- and tricarboxyphenyl, mono-, di- and trisulfophenyl, mono-, di- and trihalogenated phenyl, mono-, di- and trinitrophenyl, mono-, di- and trihydroxyphenyl, mono-, di- and trialkyl phenyl as well as mixtures such as monohalo-dialkylphenyl and dinitromonoalkylphenyl and the like.

Examples of the compositions of this invention include but are not limited to N-phenyl-2,3,6-trichlorobenzalimine, N - p - chlorophenyl - 2,3,6 - trichlorobenzalimine, N - α - naphthyl - 2,3,6 - trichlorobenzalimine, N - o - carboxyphenyl - 2,3,6 - trichlorobenzalimine, N-p - sulfophenyl - 2,3,6 - trichlorobenzalimine, N - (2,4, 6 - trinitrophenyl) - 2,3,6 - trichlorobenzalimine, N - (p-nitrophenyl) - 2,3,6 - trichlorobenzalimine, N - (2,4 - dinitrophenyl) - 2,3,6 - trichlorobenzalimine, N - (2,4 - dinitro - o - cresyl) - 2,3,6 - trichlorobenzalimine, N - (2,6 - dinitrophenyl) - 2,3,6 - trichlorobenzalimine, N - (p-cresyl) - 2,3,6 - trichlorobenzalimine, N - (o - cresyl)-2,3,6-trichlorobenzalimine.

In its composition aspect this invention makes available a series of novel herbicides highly phytotoxic to both monocotyledonous (narrowleaf) weeds or grasses, and dicotyledonous (broadleaf) weed species, and having substantial selectivity so as to permit use in various crops such as corn and sugar cane. The inventive compositions are further advantageous in that they have low volatility with little tendency to leach or decompose in the soil. The effect of this latter characteristic is to impart long term duration or perseverence of the phytotoxic compounds in the soil, necessitating only one application for seasonal effect.

In contrast, many commercially available herbicides such as 2,4-dichlorophenoxyacetic (2,4-D) are of high volatility and cause considerable damage to nearby crops because of drift. Furthermore, 2,4-D is readily decomposed by microorganisms in the soil and thus loses its phytotoxic effect a relatively short time after application and requires expensive and time consuming repeat treatments.

That these compositions have these superior herbicidal attributes at all is most surprising in view of the insufficiencies of closely related compounds. For example, the so-called "parent" amines, the 2,3,6-trihalobenzalimines are physically unstable substances which are worthless as herbicides. The 2,3,6-trihalobenzaldehyde which is the starting material for preparing these compositions is very prone to rapid volatilization from the soil. Thus, the high activity, high stability, and long perseverence of the inventive imines is most surprising and unexpected in view of the prior art literature.

An additional advantage of these novel imines is their ease of formulation. These compositions may be used in any state of purity ranging from a reaction mixture crude to a highly purified crystalline product. The compounds may be formulated alternatively as liquids or solids using inert liquids or solids as carriers or diluents. Examples of liquid diluents or carriers include water, alcohols, glycols, ketones, esters, and aliphatic and aromatic hydrocarbons. Examples of solid carriers are micas, sand, clays, talcs, vegetable flours, silicas, diatomaceous earths, alkaline earth carbonates, phosphates, oxides and hydroxides among others.

A further advantage of the novel imines of this invention is their compatibility with other pesticidal compositions including fungicides, nematocides, insecticides and other herbicides.

Frequently in the course of preparing the above listed liquid or solid formulations containing the inventive herbicidal imines by themselves or combined with other pesticides, it may be desirable to modify or condition the physical properties of the pesticidal compositions. This can be done effectively by including one or more substances variously referred to as surface active agents, wetting agents, detergents, suspending agents, dispersing agents, thickening agents, emulsifying agents or the like. These substances which simplify or improve formulation or application frequently enhance or potentiate the scope, effectiveness or duration of these formulations and are generically referred to as adjuvants.

A satisfactory but not exhaustive listing of these adjuvants may be found in "Soap and Chemical Specialties," vol. 31, No. 7, pages 50–61; No. 8, pages 48–61; No. 9, pages 52–67 and No. 10, pages 38–67 (1955), as well as Bulletin E–607 of the Bureau of Entomology and Plant Quarantine of the United States Department of Agriculture.

As indicated above, the imines or imine-pesticide compositions of this invention can be made up as solid formulations such as powders, wettable dusts, pellets, granules and the like and may be hand or mechanically broadcast, disced, rototilled, plowed or otherwise admixed with or into the soil. Where liquid formulations are utilized the solutions are sprayed on to the locus of the plants to be treated. The rate of application will be variable dependent upon such factors as soil structure, climate, type of use pre- or post-emergence, type of weeds encountered, and their stage of growth. However, under average conditions the novel imines of this invention are effective at rates between one-quarter to one hundred pounds per acre with one to twenty-five pounds being a more ordinary range. Where post-emergence treatments are the objects higher rates are generally required and rates between two and one hundred and over represents a workable range with five to fifty pounds being a typical range. For long term soil sterilization, amounts of ten to two hundred pounds per acre and even in excess of the upper figure may be required under adverse combinations of conditions or where recalcitrant mature deeply rooted perennial plants are encountered.

The preferred method of application is to apply the compositions pre-emergence as a spray in early spring after plowing and discing the soil to remove as much weed growth as possible.

The crystalline compositions of this invention are prepared by contacting equimolar quantities of 2,3,6-trihalobenzaldehyde with the appropriate primary aromatic amine in the presence of an inert organic solvent such as benzene, toluene or any other aromatic or aliphatic solvent having a boiling point above twenty-five degrees centigrade. A convenient preparation procedure is to use inert organic solvent such as benzene which forms a low boiling azeotrope which can be distilled off and thus removes the water formed during the reaction. The excess benzene or other solvent is removed by evaporation and the residue may be decanted off or recrystallized from a suitable inert solvent or solvent mixture such as benzene hexane.

Additional examples illustrating the inventive concepts, compositions, formulations and methods appear infra. Except as set forth in the claims these examples are in no way to be construed as limitation of this invention in either its composition or method aspects.

*Example 1.—Preparation of N-(o-chlorophenyl)-2,3,6-trichlorobenzalimine*

Forty-two parts of 2,3,6-trichlorobenzaldehyde, twenty-eight parts of o-chloroaniline, and forty parts of benzene were refluxed, removing the water evolved by the reaction as the benzene-water azeotrope. The benzene was then stripped and the residue recrystallized from a benzene-hexane mixture, to obtain fifty-four parts of colorless crystalline solid, melting point one hundred and fifteen to one hundred and sixteen degrees.

*Analysis.*—Calcd. for $C_{13}H_7Cl_4N$: N, 4.4 percent. Found: N, 4.4 percent.

*Examples 2–9*

By procedures similar to that of Example 1, the following representative compounds were prepared:

| | Percent N Calcd. | Percent N Found |
|---|---|---|
| N-pehnyl-2,3,6-trichlorobenzalimine MP. 61–62° C. (Example 2) | 4.9 | 4.8 |
| N-p-chlorophenyl-2,3,6-trichlorobenzalimine, M.P. 94–96° C. (Example 3) M | 4.4 | 4.2 |
| N-m-chlorophenyl-2,3,6-trichlorobenzalimine, M.P. 101° C. (Example 4) | 4.4 | 4.3 |
| N-α-naphthyl-2,3,6-trichlorobenzalimine, M.P. 128–130° C. (Example 5) | 4.2 | 4.1 |
| N-o-carboxyphenyl-2,3,6-trichlorobenzalimine, M.P. 169–71° C. (Example 6) | 4.3 | 4.6 |
| N-p-sulfophenyl-2,3,6-trichlorobenzalimine (sodium salt), decomp. above 200° C. (Example 7) | 3.6 | 3.4 |
| N-p-nitrophenyl-2,3,6-trichlorobenzalimine, decomp. over 150° C. (Example 8) | 8.5 | 8.2 |
| N-xylyl-2,3,6-trichlorobenzalimine (from mixed xylidine), M.P. 52–66° C. (Example 9) | 4.5 | 4.4 |

*Examples 10–20*

By procedures similar to Example 1, the following additional imines of this invention are prepared for herbicidal evaluation. Since only herbicidal use is contemplated, the crude reaction products are used without further purification. Infrared analysis established the identity of the compositions:

N-(2,4-dinitrophenyl)-2,3,6-trichlorobenzalimine (Example 10)
N-(o-nitrophenyl)-2,3,6-trichlorobenzalimine (Example 11)
N-(2,6-dinitro-p-cresyl)-2,3,6-trichlorobenzalimine (Example 12)
N-(2,6-dinitrophenyl)-2,3,6-trichlorobenzalimine (Example 13)
N-(p-cresyl)-2,3,6-trichlorobenzalimine (Example 14)
N-(o-cresyl)-2,3,6-trichlorobenzalimine (Example 15)
N-(p-hydroxyphenyl)-2,3,6-trichlorobenzalimine (Example 16)
N-(o-xylyl)-2,3,6-trichlorobenzalimine (Example 17)
N-(m-xylyl)-2,3,6-trichlorobenzalimine (Example 18)
N-(p-tertiarybutylphenyl)-2,3,6-trichlorobenzalimine (Example 19)
N-(2,4,6-trichlorophenyl)-2,3,6-trichlorobenzalimine (Example 20)

*Example 21*

The following ingredients are blended:

| | Parts by weight |
|---|---|
| N-o-cresyl-2,3,6-trichlorobenzalimine | 50 |
| Non-ionic emulsifier (polyoxyethylene sorbitan ether) | 40 |
| Xylene | 150 |

The mixture is an oil emulsifiable with water.

*Example 22*

The following ingredients are blended:

| | Parts by weight |
|---|---|
| N-(2,6-dinitrophenyl)-2,3,6-trichlorobenzalimine | 5 |
| Attapulgus clay | 95 |

The constituents are blended to make a dust.

A representative method of use of the compounds of our invention is illustrated by the following example:

*Example 23*

The following ingredients are blended:

| | Parts by weight |
|---|---|
| N-(p-sulfophenyl)-2,3,6-trichlorobenzalimine (sodium salt) | 50 |
| Clay (Microcel E) | 40 |
| Dispersing agent (lignin sulfonic acid salt) | 5 |
| Wetting agent (sodium alkylnaphthalene sulfonate) | 5 |

The constituents are pulverized in an air-mill to prepare a powder.

*Example 24*

An area infested with seeds of pigweed, mustard, crabgrass, and ragweed was plowed, disced, and seeded with corn. The seeded area was divided into plots which were sprayed with aqueous dispersions of the compositions of this invention at the rate of three pounds per acre. Several plots were left unsprayed as controls. One month later, the treated and untreated plots were inspected and the weed control relative to the unsprayed control areas was estimated and the following results obtained:

| Chemical of Example No. | Control of Indicated Species | | | | Corn Damage |
|---|---|---|---|---|---|
| | Pigweed | Mustard | Ragweed | Crabgrass | |
| 1 | 100 | 90 | 100 | 70 | Nil |
| 2 | 100 | 100 | 100 | 60 | Nil |
| 3 | 100 | 90 | 100 | 80 | Nil |
| 4 | 100 | 90 | 100 | 80 | Nil |
| 5 | 100 | 100 | 100 | 80 | Nil |
| 6 | 100 | 90 | 100 | 70 | Nil |
| 7 | 100 | 90 | 100 | 80 | Nil |
| 8 | 100 | 90 | 100 | 90 | Nil |
| 9 | 100 | 85 | 100 | 80 | Nil |
| 11 | 100 | 100 | 100 | 70 | Nil |
| 12 | 100 | 95 | 100 | 60 | Nil |
| 13 | 100 | 100 | 100 | 100 | Nil |
| 14 | 100 | 90 | 100 | 60 | Nil |
| 15 | 100 | 90 | 100 | 50 | Nil |
| 16 | 100 | 80 | 100 | 60 | Nil |

We claim:
1. N-substituted-2,3,6-trichlorobenzalimines of the structure

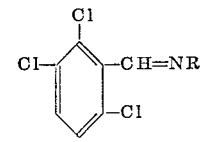

wherein R is selected from the group consisting of phenyl, naphthyl, and phenyl-substituted by at least one substituent selected from the group consisting of chlorine, carboxy, hydroxy, nitro, lower alkyl and sulfo radicals.

2. N-phenyl-2,3,6-trichlorobenzalimine.

3. N-(α-naphthyl)-2,3,6-trichlorobenzalimine.
4. N-(o-carboxyphenyl)-2,3,6-trichlorobenzalimine.
5. N-(p-nitrophenyl)-2,3,6-trichlorobenzalimine.
6. N-(2,4-dinitrophenyl)-2,3,6-trichlorobenzalimine.
7. N-(2,6-dinitro-p-cresyl)-2,3,6-trichlorobenzalimine.
8. N-(2,6-dinitrophenyl)-2,3,6-trichlorobenzalimine.
9. N-(o-nitrophenyl)-2,3,6-trichlorobenzalimine.

References Cited by the Examiner

UNITED STATES PATENTS

| | | | |
|---|---|---|---|
| 2,027,902 | 1/1936 | Dahlen | 260—566 XR |
| 2,703,333 | 3/1955 | Rowlands | 260—566 |
| 2,847,472 | 8/1958 | Robertson | 260—566 |
| 2,847,473 | 8/1958 | Robertson | 260—566 |
| 2,863,752 | 12/1958 | Hamm et al. | 71—2.3 |
| 2,955,927 | 10/1960 | Ramey et al. | 71—2.3 |
| 2,977,209 | 3/1961 | Tilles et al. | 71—2.3 |
| 2,978,310 | 4/1961 | Daams et al. | 71—2.3 |
| 3,046,104 | 7/1962 | Ehlers et al. | 71—2.3 |
| 3,084,192 | 4/1963 | Smathers | 260—564 |

OTHER REFERENCES

Beaver et al.: J.A.C.S., vol. 78, pp. 1236–1245 (1957).
Berdn et al.: C.A., vol. 43, pp. 7625–7626 (1949).
Blanksma: C.A. vol. 7, pp. 719–720 (1913).
Gnehm et al.: Ann. der Chem., vol. 299, 347–367 (1898).
Lock: Monatsch Chem., vol. 90, pp. 683–687 (1959).
Reich: Bull. Soc., Chim. France, 4th Series, vol. 21, pp. 217 to 225 (1917), QD 154 Lock (I), Ber. Deut. Chem., vol. 72, pp. 300–304 (1938), QD1D4 Grammaticakis, Bull, Soc. Chim. France, 5th Series, vol. 18, pp. 965 to 972 (1951).
Sandermann et al.: C.A., vol. 53, 20792 (1959).

CHARLES P. PARKER, *Primary Examiner.*

L. ZITVER, *Examiner.*